F. G. McPHERSON.
MAT OR TREAD.
APPLICATION FILED SEPT. 21, 1908.
945,576.
Patented Jan. 4, 1910.
2 SHEETS—SHEET 1.
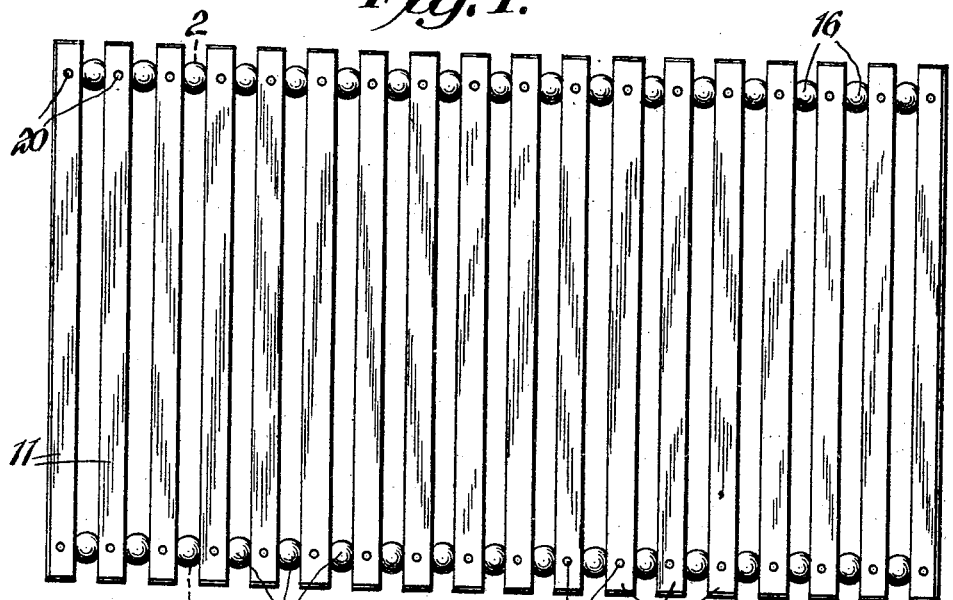
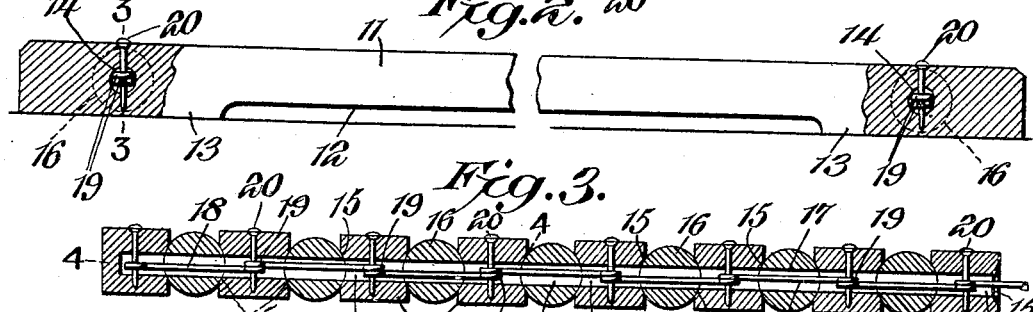
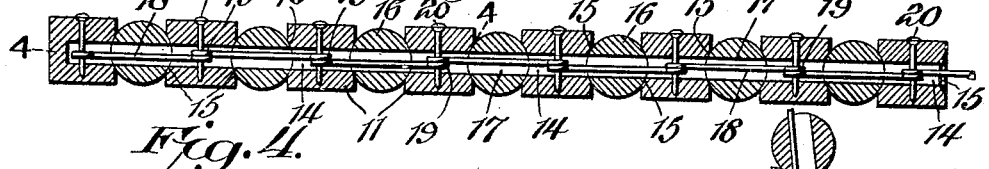
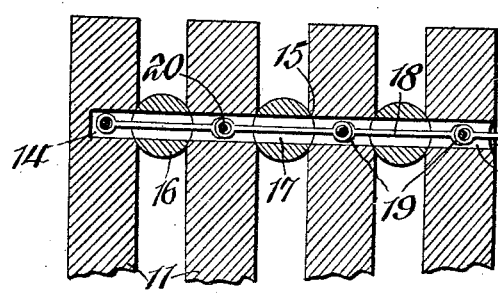
Witnesses
Howard D. Orr
Frank G. McPherson, Inventor,
By E. G. Siggers
Attorney

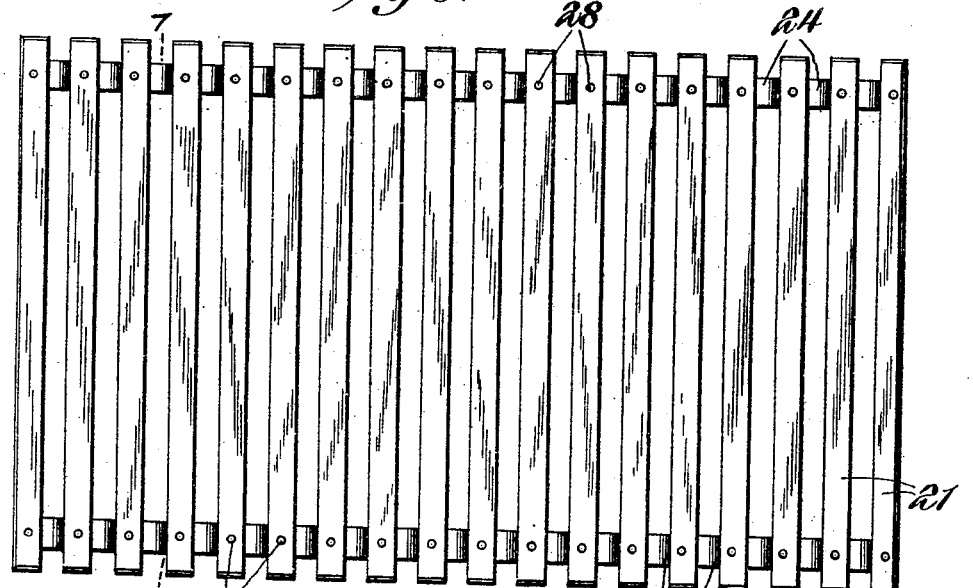
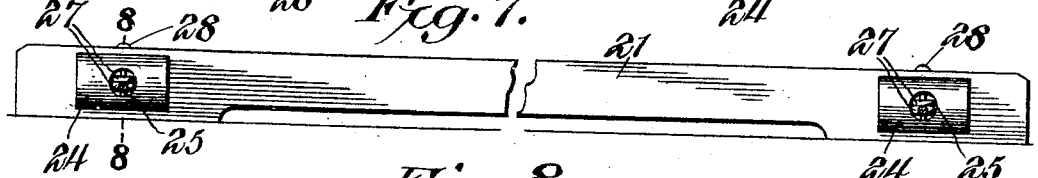
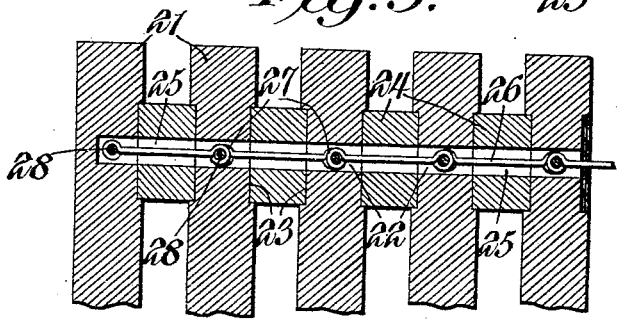
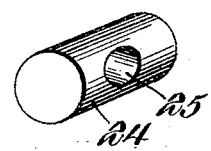

UNITED STATES PATENT OFFICE.

FRANK G. McPHERSON, OF BEAVER FALLS, PENNSYLVANIA.

MAT OR TREAD.

945,576.  Specification of Letters Patent.  Patented Jan. 4, 1910.

Application filed September 21, 1908. Serial No. 454,081.

*To all whom it may concern:*

Be it known that I, FRANK G. MCPHERSON, a citizen of the United States, residing at Beaver Falls, in the county of Beaver and State of Pennsylvania, have invented a new and useful Mat or Tread, of which the following is a specification.

This invention relates to a tread or mat.

The principal object of the present invention is to provide a durable structure that will lie entirely flat, is very flexible, and is not apt to become bent or misshapen, the parts moreover being interengaged in such a manner that the tie or connecting elements are relieved of lateral strain.

In the drawings:—Figure 1 is a plan view of one embodiment of the invention. Fig. 2 is a sectional view on an enlarged scale and substantially on the line 2—2 of Fig. 1. Fig. 3 is a sectional view on the line 3—3 of Fig. 2. Fig. 4 is a horizontal sectional view on the line 4—4 of Fig. 3. Fig. 5 is a view similar to Fig. 3, but illustrating the relation of the parts when the mat is smooth. Fig. 6 is a plan view of another embodiment of the invention. Fig. 7 is a sectional view on the line 7—7 of Fig. 6. Fig. 8 is a sectional view on the line 8—8 of Fig. 7. Fig. 9 is a horizontal sectional view on the line 9—9 of Fig. 8. Fig. 10 is a perspective view of one of the separator elements.

Similar reference numerals designate corresponding parts in all the figures of the drawings.

In the embodiment disclosed in the first five figures, a plurality of separator slats 11 is employed, the under sides of which are cut away, as shown at 12, the cut-away portions terminating short of the ends of the slats, thereby providing supporting feet 13 and a channel that extends beneath the entire mat. The thickened end portions of the slats are provided with transverse openings 14 terminating in concaved sockets 15. Interposed between the end portions of the slats are separator elements in the form of spheres 16, the opposite rounded portions of which are located in the sockets 15. These separator elements have openings 17 therethrough that aline with the openings 14 so as to form passages extending longitudinally of the mat.

The various slats are connected by a flexible element disposed in each passage and consisting of links 18 that pass through the openings 17 in the separator elements and have overlapping terminal eyes 19 arranged in the openings 15 of the slats. Fasteners 20, in the form of nails or other devices, are driven through the end portions of the slats and pass through the overlapped eyes 19. It will be noted by reference to Fig. 3 that the openings 15 do not pass all the way through the outermost slats, and thus a better finish is provided than if they did.

It will be observed that the openings 14 and 17 are of greater diameter than the links 18. Consequently as shown in Fig. 5, the mat can be curved without bending the links inasmuch as the eyes slide freely upon the fasteners 20. Moreover as the separator elements have their opposite portions engaged in the sockets 15, said elements are supported in spaced relation to the links, as will be seen by reference to Fig. 3. Since the openings 14 and 17 are of such diameter as to provide freedom of movement of the links, as above described, there would be a tendency for the slats to move longitudinally with respect to each other so that the ends would not be maintained in line, and furthermore, the separating blocks would tend to become displaced vertically with respect to the slats so as to present obstructions at the top of the mat, which would be objectionable because of the likelihood of tripping persons walking on the mat, but these tendencies are effectively overcome by providing the sockets 15 in the opposed faces of the slats and entering the separating elements 16 in such sockets.

A slightly different form of construction is shown in Figs. 6–10 inclusive. In this embodiment of the invention, the slats are designated 21, and are provided with transverse openings 22 and sockets 23, these sockets being, however, elongated to receive cylindrical separator elements 24. The separator elements have openings 25 alined with the openings 22, and links 26, passing through said elements, have overlapped terminal eyes 27 located in the openings 22 of the slats. Holding pins 28, passing through the eyes, secure the parts together. It will be evident that this structure has all the advantages of the first described embodiment, and it will more rigidly maintain the slats against relative longitudinal play.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In a structure of the character set forth, the combination with spaced slats having sockets in their opposite sides, of separator elements interposed between the slats and having their opposite portions engaged in the sockets, and devices for connecting the slats and elements together, said devices being loosely attached to the slats for permitting relative movement between the slats and elements.

2. In a structure of the character set forth, the combination with spaced slats having sockets in their opposite sides, of separator elements interposed between the slats and having opposite rounded faces located in the sockets and bearing against the walls thereof for preventing relative displacement between the slats and separating elements, and means for securing the slats together and maintaining the separator elements in the sockets, said means extending loosely through the elements to provide for relative movement between the latter and means for rendering the said structure flexible.

3. In a structure of the character set forth, the combination with spaced slats having transversely disposed openings in their ends and having concaved sockets in their opposite sides surrounding the openings, of separator elements interposed between the slats and provided with openings that are alined with the openings of the slats, said elements having rounded opposite faces that are located in the sockets and bear against the walls thereof, and connecting means extending through the various openings and movable transversely therein to secure the slats together and maintain the separator elements in place.

4. In a structure of the class described, the combination of a plurality of spaced members having sockets in their opposed walls and provided with openings coincident with the sockets, a separating element loosely bearing in the sockets of both members and having an opening registering with the openings of the latter, a connecting link passing longitudinally through the opening of the separating element and extending into the openings of the members, and fastenings in the members extending transversely to the openings thereof and passing through the extremities of the links for connecting the members and element together to permit the members to have a limited movement about the element as a center, the link being movable from one side of the opening in the element to the opposite side and the extremities of the link being slidable on the said fasteners.

5. In a structure of the character set forth, the combination of spaced slats having openings therethrough, of links connecting the slats and having terminal eyes movably disposed in the openings, each link being of such length as to extend from one slat to the next adjacent slat, fasteners carried by the slats and engaging in the eyes to secure the links together, said eyes being slidable longitudinally of the fasteners within the limits of the openings of the slats.

6. In a structure of the character set forth, the combination with spaced slats having transverse openings through their end portions and having sockets at the ends of the openings, of separator elements interposed between the slats and having rounded opposite portions engaged in the sockets, said elements also having openings alined with the openings in the slats, links passing through the separator elements and having overlapping terminal eyes located in the openings in the slats, and fasteners passing transversely through the slats and through the overlapped eyes.

7. A mat comprising spaced slat elements having openings, separating elements having openings alined with the openings of the slat elements to form a passage extending through the mat, a flexible connecting device extending through the said passage and movable transversely therein and having spaced eyes coincident with alternate elements, and fasteners in such alternate elements passing through the eyes and on which the latter are slidable.

8. A mat comprising spaced slat elements having openings, spacing elements having openings alining with the openings of the slat elements to form a passage extending through the mat, the alternate elements having sockets in their opposed faces into which the intermediate element movably fits, a connecting device extending longitudinally of the passage and movable transversely therein and having eyes disposed at alternate elements, and fastenings in such alternate elements passing through the said eyes and on which the latter are free to move.

9. A mat comprising spaced slat elements having openings arranged in alinement, separating elements having openings alined with the openings of the slat elements to form a single passage, the alternate elements having concave sockets and each intermediate element having portions engaging in the said sockets, a connecting device extending longitudinally through the said passage and movable transversely therein, and fastenings in alternate elements extending loosely through the said device and across the said passage to prevent movement of the elements longitudinally of the connecting device.

10. A mat comprising spaced slat elements having openings arranged in alinement, separating elements having openings alined with those of the slats to form a single passage, each pair of adjacent elements having in their opposed surfaces a socket and a portion fitting in the socket, a flexible connecting device extending longitudinally through the passage and freely movable transversely therein, and fastening devices carried by some of the elements and extending through the connecting device and on which the latter is free to move transversely to the passage.

In testimony, that I claim the foregoing as my own, I have hereto affixed my signature in the presence of two witnesses.

FRANK G. McPHERSON.

Witnesses:
 CHAS. M. ELLIOTT,
 FRANK C. PERROTT.